United States Patent
Kakiya

(10) Patent No.: US 10,742,740 B2
(45) Date of Patent: Aug. 11, 2020

(54) IN-VEHICLE NETWORK SYSTEM

(71) Applicant: TOYOTA JIDOSHA KABUSHIKI KAISHA, Toyota-shi, Aichi-ken (JP)

(72) Inventor: Yoshinori Kakiya, Chofu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 53 days.

(21) Appl. No.: 15/846,824

(22) Filed: Dec. 19, 2017

(65) Prior Publication Data
US 2018/0183876 A1    Jun. 28, 2018

(30) Foreign Application Priority Data
Dec. 26, 2016    (JP) .................. 2016-252021

(51) Int. Cl.
| H04L 29/08 | (2006.01) |
| H04L 29/12 | (2006.01) |
| H04L 12/40 | (2006.01) |
| G05D 1/00 | (2006.01) |
| H04L 29/06 | (2006.01) |

(52) U.S. Cl.
CPC ........ H04L 67/12 (2013.01); H04L 12/40136 (2013.01); H04L 61/2007 (2013.01); G05D 1/0088 (2013.01); H04L 61/6022 (2013.01); H04L 69/22 (2013.01); H04L 2012/40273 (2013.01)

(58) Field of Classification Search
None
See application file for complete search history.

(56) References Cited

U.S. PATENT DOCUMENTS

| 6,181,432 B1* | 1/2001 | Furuya .................. G06K 15/00 358/1.11 |
| 6,678,246 B1 | 1/2004 | Smyth |
| 2001/0051972 A1* | 12/2001 | Eydelman ................ G06F 9/54 709/200 |
| 2004/0258081 A1* | 12/2004 | Hayashi ............. H04L 12/4625 370/401 |

(Continued)

FOREIGN PATENT DOCUMENTS

JP    2010-233240 A    10/2010

Primary Examiner — Alex Skripnikov
Assistant Examiner — Sharmin Chowdhury
(74) Attorney, Agent, or Firm — Hunton Andrews Kurth LLP

(57) ABSTRACT

An in-vehicle network system includes a first control unit, a second control unit, and a network connecting the first control unit to the second control unit. The first control unit performs a process of transmitting data, which is target of high-speed processing, having a first data length obtained by dividing transmission data by the first data length or obtained by adding predetermined data to the transmission data as high-speed processing. The second control unit performs a process of receiving reception data at a first processing speed that is a low speed when the second control unit determines that a data length of the reception data is not the first data length, and performs a process of receiving the reception data at a second processing speed higher than the first processing speed when the second control unit determines that the data length of the reception data is the first data length.

6 Claims, 7 Drawing Sheets

(56) References Cited

U.S. PATENT DOCUMENTS

| | | | |
|---|---|---|---|
| 2014/0036928 A1* | 1/2014 | Roy | G06F 13/385 370/412 |
| 2016/0121816 A1* | 5/2016 | Koo | H04L 12/4013 370/476 |
| 2016/0378714 A1* | 12/2016 | Kinoshita | H04L 1/188 709/212 |

* cited by examiner

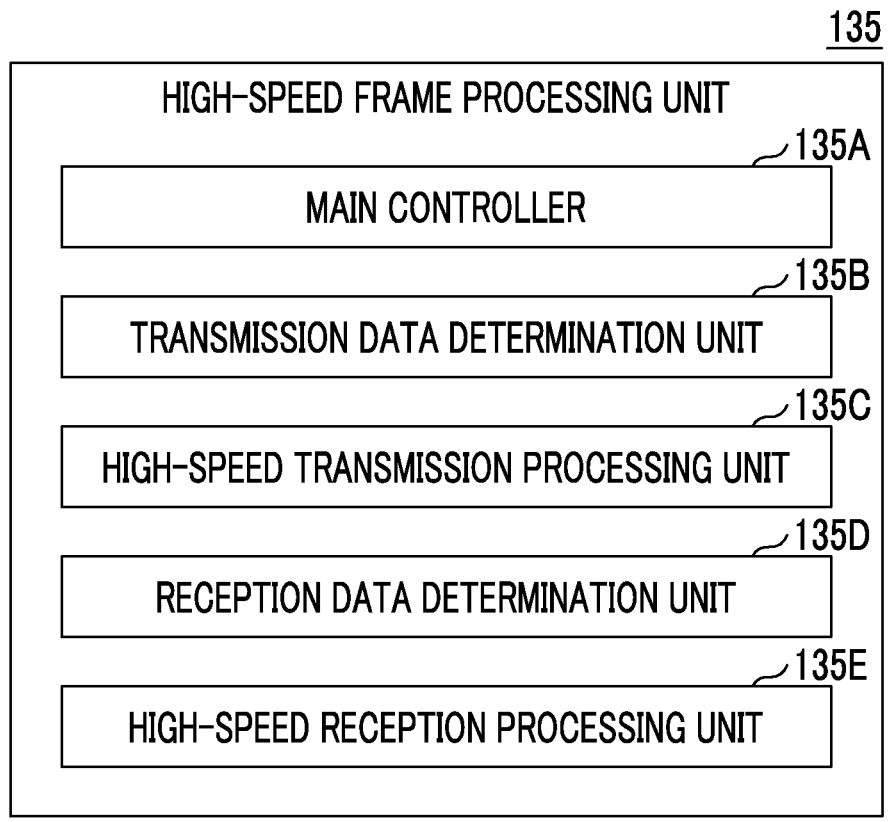

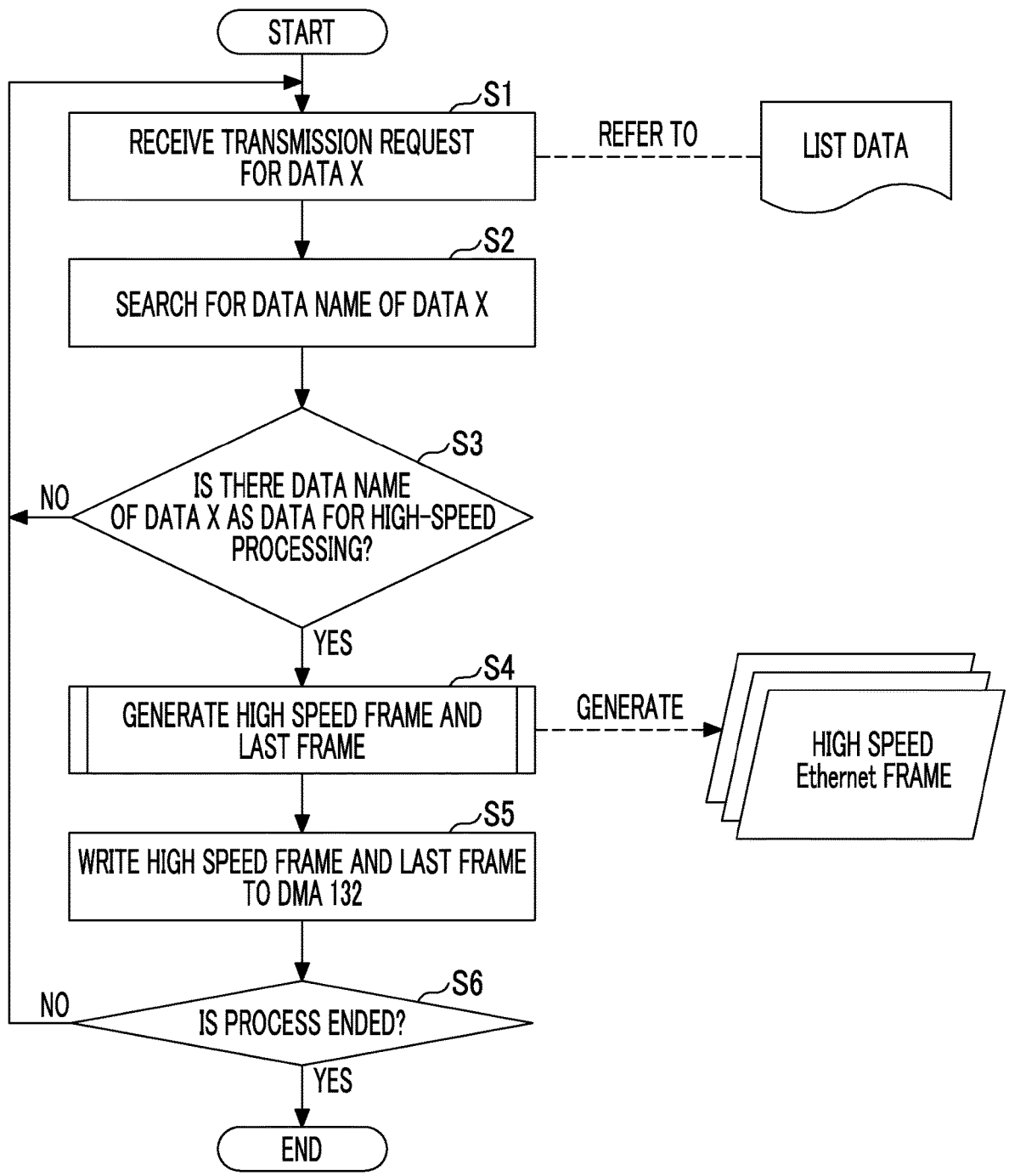

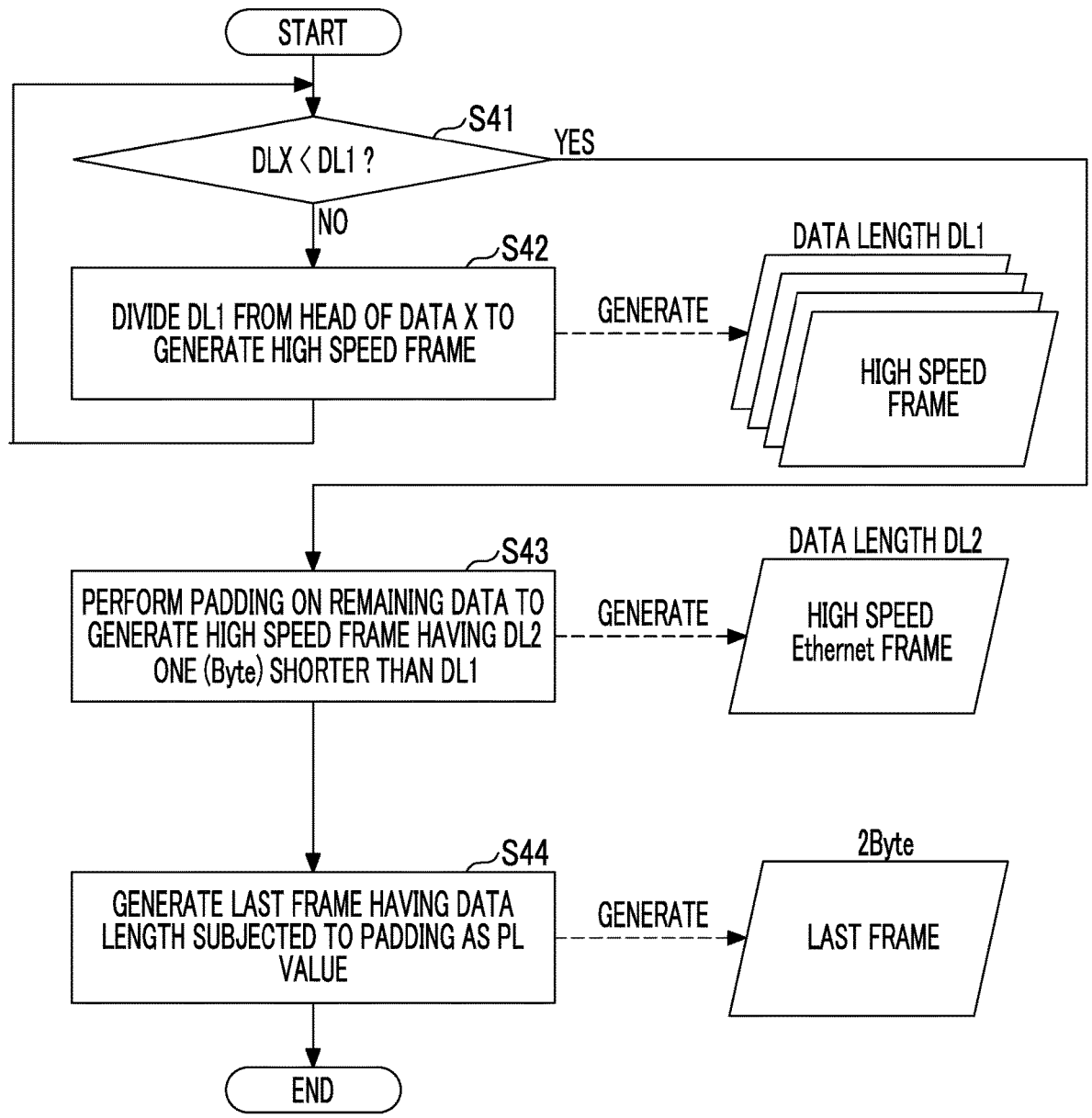

IN-VEHICLE NETWORK SYSTEM

INCORPORATION BY REFERENCE

The disclosure of Japanese Patent Application No. 2016-252021 filed on Dec. 26, 2016 including the specification, drawings and abstract is incorporated herein by reference in its entirety.

BACKGROUND

1. Technical Field

The present disclosure relates to an in-vehicle network system.

2. Description of Related Art

In the related art, there is a data packet processing device including a plurality of nodes having two processors (first and second processors) mounted thereon. When there is data to be transmitted in real time, a transmission node generates a template packet and notifies a reception node of the template packet storing data to be processed at high speed prior to start of communication, such that the template packet is shared between the transmission node and the reception node.

When the reception node receives the template packet, the reception node performs a process with the second processor. Accordingly, a processing load of the first processor is reduced (see, for example, Japanese Unexamined Patent Application Publication No. 2010-233240 (JP 2010-233240 A)).

SUMMARY

Incidentally, since the data packet processing device of the related art uses a unique format as a template packet, a unique process corresponding to the unique format is needed. The unique process corresponding to the unique format (data format) is not suitable for high-speed processing since a processing time becomes long. Further, this is not limited to a case where the unique format is used, and the same applies to a case where unique data is added for distinguishment of data to be transmitted in real time.

Therefore, the process is not suitable for an in-vehicle network in which there is data having a high priority on which high-speed processing is to be preferentially performed.

Accordingly, the present disclosure provides an in-vehicle network system capable of processing data having a high priority at high speed without adding a unique data format or unique data.

An aspect of the present disclosure relates to an in-vehicle network system including a first control unit, a second control unit, and a network connecting the first control unit to the second control unit. The first control unit is configured to determine whether transmission data is a target of high-speed processing at a second processing speed higher than a first processing speed, and perform a process of transmitting the transmission data determined not to be the target of high-speed processing to the network at the first processing speed, and perform a process of transmitting data having a first data length obtained by dividing the transmission data determined to be the target of high-speed processing by the first data length or obtained by adding predetermined data to the transmission data determined to be the target of high-speed processing to obtain the first data length, to the network at the second processing speed. The second control unit is configured to determine whether a data length of reception data received via the network is the first data length, perform a process of receiving the reception data at the first processing speed when the second control unit determines that the reception data does not have the first data length, and perform a process of receiving the reception data at the second processing speed when the second control unit determines that the reception data has the first data length.

Therefore, it is possible to determine whether the reception data is data for high-speed processing (the second processing speed) by determining whether the data length of the reception data is the first data length. It is not needed for a unique data format or data to be used for the determination.

Therefore, it is possible to provide an in-vehicle network system capable of processing data having a high priority at high speed without adding a unique data format or unique data.

In the in-vehicle network system according to the aspect of the present disclosure, when data shorter than the first data length is generated at an end of a frame when the first control unit divides the transmission data by the first data length from a head of the frame, the first control unit may be further configured to add predetermined data to the data to generate data having a second data length a predetermined data length shorter than the first data length, and transmit data having the second data length at the second processing speed. The second control unit may further be configured to determine whether the data length of the reception data is the second data length, and determine that the reception data is data of the last reception data among a plurality of pieces of reception data divided from the transmission data when the second control unit determines that reception data subsequent to the reception data determined to have the first data length has the second data length.

Therefore, it is possible to determine whether the reception data received by the second control unit is the last reception data according to whether or not a data length of the reception data received by the second control unit is the second data length. The reception data is data obtained by dividing the transmission data in the first control unit, which is received by the second control unit.

Therefore, it is possible to provide an in-vehicle network system capable of processing data having a high priority at high speed without adding a unique data format or unique data and discriminating the last reception data.

In the in-vehicle network system according to the aspect of the present disclosure, the first control unit may be configured to further include list data indicating an identifier of the transmission data that is the target of high-speed processing and the first data length, determine whether the transmission data is the target of high-speed processing using the identifier of the list data, and perform a process of transmitting data having the first data length based on the first data length of the list data. The second control unit may be configured to further include the list data, and determine whether the data length of the reception data is the first data length based on the first data length of the list data.

Therefore, the first control unit on the transmission side can discriminate the transmission data that is a target of high-speed processing using the identifier and the data length, and the second control unit on the reception side can discriminate whether or not the reception data is the target of high-speed processing using the identifier and the data length.

Therefore, it is possible to provide an in-vehicle network system capable of processing data having a high priority at high speed by discriminating whether or not the reception data is the target of high-speed processing using the identifier and the data length without adding a unique data format or unique data.

The aspect of the present disclosure can provide an in-vehicle network system capable of processing data having a high priority at high speed without adding a unique data format or unique data.

In the in-vehicle network system of the aspect according to the present disclosure, a frame structure of the transmission data determined to be the target of high-speed processing may be a high speed Ethernet frame. The frame may include a destination media access control (MAC) address, a transmission source MAC address, a data length, a payload, and a frame check sequence, the destination MAC address may be a MAC address of a destination of data, and the divided transmission data may be stored in the payload.

In the in-vehicle network system according to the aspect of the present disclosure, the first control unit may be configured to perform a process of transmitting transmission data determined not to be the target of high-speed processing to the network as a frame of data for normal-speed processing, the frame of data for normal-speed processing being a signaling packet including the destination MAC address, the transmission source MAC address, the data length, an IP header that is a data frame, a UDP/TCP header, the payload, and the frame check sequence, and control data length of the data frame to be smaller than a minimum value of the data length of the transmission data that is the target of high-speed processing.

In the in-vehicle network system according to the aspect of the present disclosure, the first control unit may be configured to perform a process of transmitting transmission data that is the target of high-speed processing to the network via direct memory access.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a diagram illustrating a configuration of a high-speed frame processing unit;

FIG. 4 is a diagram illustrating list data;

FIG. 7 is a diagram illustrating a flowchart of a transmission process performed by the high-speed frame processing unit;

FIG. 8 is a diagram illustrating a flowchart of a transmission process performed by the high-speed transmission processing unit;

DETAILED DESCRIPTION OF EMBODIMENTS

Hereinafter, an embodiment in which an in-vehicle network system of the present disclosure has been applied will be described.

Embodiment

Figure 1:
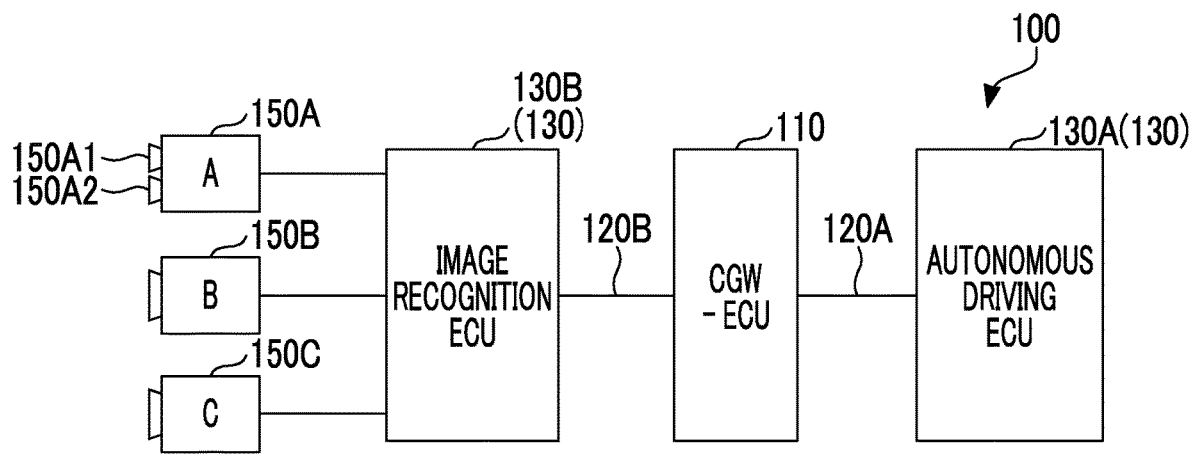
FIG. 1 is a diagram illustrating an in-vehicle network system according to an embodiment.

FIG. 1 is a diagram illustrating an in-vehicle network system 100 of the embodiment. The in-vehicle network system 100 processes data having a high priority at high speed. Here, the data having a high priority is, for example, data having a relatively long data length and is data that needs real-time processing. Needing real-time processing means needing performance of high-speed processing and transfer real-time data. Accordingly, the data having a high priority is typically data indicating an image of surroundings of a vehicle.

The in-vehicle network system 100 includes a central gateway (CGW)-electronic control unit (ECU) 110, buses 120A, 120B, an autonomous driving ECU 130A, and an image recognition ECU 130B. The autonomous driving ECU 130A and the image recognition ECU 130B are connected to the CGW-ECU 110 via the buses 120A, 120B, respectively. Here, one of the autonomous driving ECU 130A and the image recognition ECU 130B is an example of a first control unit, and the other is an example of a second control unit. The buses 120A, 120B are examples of a network.

The in-vehicle network system 100 also includes ECUs other than the autonomous driving ECU 130A and the image recognition ECU 130B, but the autonomous driving ECU 130A and the image recognition ECU 130B are illustrated by way of example herein. When the autonomous driving ECU 130A and the image recognition ECU 130B are not distinguished from each other, the autonomous driving ECU 130A and the image recognition ECU 130B are referred to as an ECU 130.

The CGW-ECU 110, the autonomous driving ECU 130A, and the image recognition ECU 130B are realized by, for example, a computer including a central processing unit (CPU), a random access memory (RAM), a read only memory (ROM), a clock generation unit, an input and output interface, a communication interface, a transmission and reception unit, and an internal bus.

The in-vehicle network system 100 is mounted on a vehicle and communicates between the autonomous driving ECU 130A and the image recognition ECU 130B. Hereinafter, the vehicle refers to a vehicle on which the in-vehicle network system 100 is mounted, unless otherwise specified.

The CGW-ECU 110 includes a normal processing unit that performs a data transfer process using an L7 switch, an L3 switch, and an L2 switch, a media access controller, a high-speed frame processing unit that performs frame processing for higher-speed processing than that in the normal processing unit, and a direct memory access (DMA). The normal processing unit can perform switching to a switch to be used. Further, the media access controller, the high-speed frame processing unit, and the DMA will be described below. Such a CGW-ECU 110 may be regarded as a hub ECU.

Here, the L7 switch is a switch that checks application-level protocol (usage protocol) information corresponding to layer 7 (application layer) of an open systems interconnection (OSI) reference model to perform a packet transfer process. The L7 switch performs switching in a software manner.

Further, the L3 switch is a switch having a mechanism for distributing a transmission destination address of a packet in layer 3 (network layer) in the OSI reference model, and performs switching in the software manner. In the L3 switch, an Internet protocol (IP) is used as a transfer protocol. The L3 switch may perform switching in a hardware manner.

Further, the L2 switch is a switch that determines a relay destination with a media access control (MAC) address included as destination information in data in layer 2 (data link layer) in the OSI reference model, and performs a relay operation. The L2 switch performs switching in the hardware manner.

The buses 120A, 120B are buses that perform data communication according to a data format of layer 2 (data link layer) in the OSI reference model. Although the two buses 120A, 120B are illustrated in FIG. 1, more buses are actually connected to the CGW-ECU 110, and various ECUs are connected to the respective buses.

The autonomous driving ECU 130A is an ECU that performs control of autonomous driving at level 1 or higher, which is determined by the National Highway Traffic Safety Administration (NHTSA). The autonomous driving ECU 130A outputs travel control data for causing the vehicle to travel to the bus 120A using surrounding surveillance data (camera images, target information, route information, or the like) of the vehicle. Further, the autonomous driving ECU 130A displays data (multimedia data) indicating a travel situation on a display panel or the like in the vehicle.

Further, the camera images are images that are acquired by cameras 150A, 150B, 150C mounted on the vehicle. Further, the target information is data such as an image indicating a feature, a building, or the like that is used for a three-dimensional (3D) map. Further, the route information is data indicating a position and a route of the own vehicle in the map data.

The travel control data for causing the vehicle to travel includes an accelerator operation amount, a control amount for controlling a braking force of a brake, a steering amount of steering, lighting control data of blinkers, or lighting control of lights or the like and, for example, is control data needed for control of the ECUs included in the in-vehicle network system 100 when causing the vehicle to travel according to level 1, 2, 3, or 4 determined by the National Highway Traffic Safety Administration (NHTSA).

Here, the level of autonomous driving is indicated by the level determined by the National Highway Traffic Safety Administration (NHTSA), but the level of autonomous driving or an aspect of autonomous driving may be represented by another standard or the like. In this case, the autonomous driving may be a vehicle performing at least one of an accelerator operation, a steering operation, and a brake operation.

Image data indicating images of front, rear, right, and left sides of the vehicle acquired by the cameras 150A, 150B, 150C is output to the image recognition ECU 130B. The image recognition ECU 130B outputs the image data input from the cameras 150A, 150B, 150C to the CGW-ECU 110 via the bus 120B. The GW-ECU 110 relays (transfers) the image data to the autonomous driving ECU 130A.

The cameras 150A, 150B, 150C are provided at the front, rear, right, and left sides of the vehicle on which the in-vehicle network system 100 is mounted. The camera 150A is a stereo camera having two imaging units 150A1, 150A2. The camera 150A outputs image data indicating a stereoscopic image of the front of the vehicle to the image recognition ECU 130B. The camera 150B outputs image data indicating an image of the rear of the vehicle to the image recognition ECU 130B. There are actually two cameras 150C, which output image data indicating images of the right and left sides of the vehicle to the image recognition ECU 130B.

Figure 2:
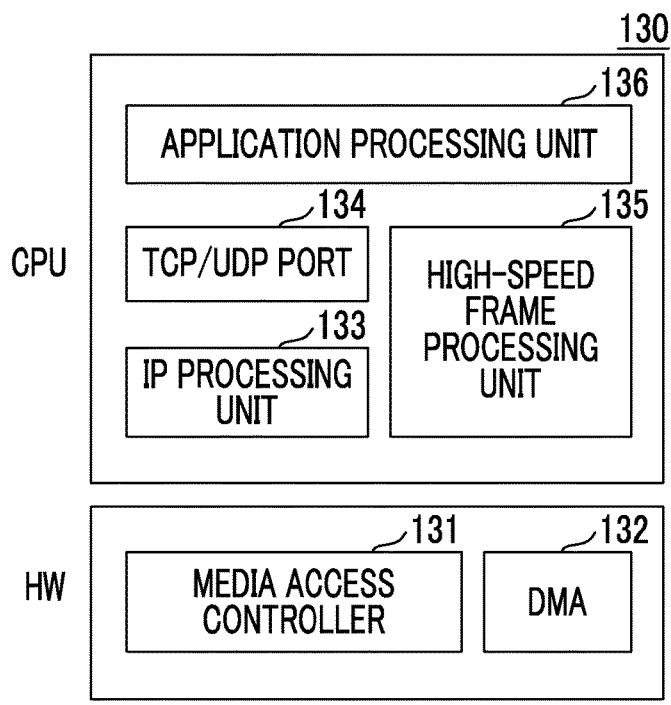
FIG. 2 is a diagram illustrating a configuration of an ECU.

FIG. 2 is a diagram illustrating a configuration of the ECU 130. FIG. 2 illustrates a hardware configuration of the ECU 130 and a functional block realized by the CPU executing a program.

The ECU 130 includes a media access controller 131, a DMA 132, an IP processing unit 133, a TCP/UDP port 134, a high-speed frame processing unit 135, and an application processing unit 136. The media access controller 131 and the DMA 132 are realized as hardware. The IP processing unit 133, the transmission control protocol (TCP)/user datagram protocol (UDP) port 134, the high-speed frame processing unit 135, and the application processing unit 136 are functional blocks realized by a CPU executing a program.

The media access controller 131 is a layer belonging to layer 2 (data link layer) in the OSI reference model. The DMA 132 is a hardware processing unit that directly transfers data without using a CPU. The DMA 132 belongs to layer 2 (data link layer) in the OSI reference model.

The IP processing unit 133 is a processing unit that distributes transmission destination addresses of packets in layer 3 (network layer) in the OSI reference model. The TCP/UDP port 134 is a transport layer (layer 4).

The high-speed frame processing unit 135 transmits and receives data of a high speed frame in a real-time packet format. The high-speed frame processing unit 135 will be described below in detail with reference to FIG. 3. The high-speed frame processing unit 135 belongs to layer 3 (network layer) in the OSI reference model. The application processing unit 136 is an application layer (layer 7).

The ECU 130 as described above performs a process of transmitting data for normal-speed processing and data for high-speed processing and a process of receiving data for normal-speed processing and data for high-speed processing. In the ECU 130, the IP processing unit 133 and the TCP/UDP port 134 are an example of a first control unit that performs a process of transmitting the data for normal-speed processing, and an example of a second control unit that performs a process of receiving the data for normal-speed processing. Here, the normal speed is a speed at which data in a signaling packet format of Ethernet (registered trademark) is transmitted and received. Further, the high speed is a processing speed higher than the normal speed and is, for example, a speed at which data in a real-time packet format of the Ethernet is transmitted and received.

FIG. 3 is a diagram illustrating a configuration of the high-speed frame processing unit 135. The high-speed frame processing unit 135 includes a main controller 135A, a transmission data determination unit 135B, a high-speed transmission processing unit 135C, a reception data determination unit 135D, and a high-speed reception processing unit 135E. The transmission data determination unit 135B and the high-speed transmission processing unit 135C are processing units on the data transmission side, and the reception data determination unit 135D and the high-speed reception processing unit 135E are processing units on the data reception side.

The main controller 135A is a controller that controls an entire process of the high-speed frame processing unit 135. The main controller 135A performs the process of the high-speed frame processing unit 135 other than processes that are performed by the transmission data determination unit 135B, the high-speed transmission processing unit 135C, the reception data determination unit 135D, and the high-speed reception processing unit 135E.

The transmission data determination unit 135B determines whether transmission data and reception data are data for normal-speed processing or data for high-speed processing. For the determination, list data in which data name of the data for high-speed processing, a transmission source MAC address, and a data length are associated is used. The list data will be described with reference to FIG. 4.

The high-speed transmission processing unit 135C performs a process of transmitting the data for high-speed processing determined by the transmission data determination unit 135B. The high-speed transmission processing unit 135C is an example of the first control unit.

The reception data determination unit 135D determines whether a data length of the reception data is a data length of the data for high-speed processing. List data in which a transmission source MAC address of the data for high-speed processing and the data length are associated is used.

The high-speed reception processing unit 135E performs a process of receiving the data for high-speed processing. The high-speed reception processing unit 135E is an example of the second control unit.

FIG. 4 is a diagram illustrating the list data. The list data is referred to when the transmission data determination unit 135B determines whether the transmission data is the data for normal-speed processing or the data for high-speed processing. Further, the list data is referred to when the reception data determination unit 135D determines whether the reception data is the data for normal-speed processing or the data for high-speed processing.

The list data is data in a table format in which the data name of the data for high-speed processing, the transmission source MAC address, and the data length are associated. The data name is a name indicating the data for high-speed processing and is an example of an identifier for identifying data. The transmission source MAC address is a MAC address assigned to a device, an ECU, or the like that becomes a transmission source (transfer source) of the data for high-speed processing. The data length is a data length of the data for high-speed processing.

The in-vehicle network system 100 distinguishes between the data for high-speed processing and the data for normal-speed processing using the data length. When the in-vehicle network system 100 distinguishes between the data for high-speed processing and the data for normal-speed processing, the in-vehicle network system 100 distinguishes between the data for high-speed processing and the data for normal-speed processing using the data length of the transmission data or the reception data without using a unique data format or unique data.

As illustrated in FIG. 4, in an image of a front camera 1 (an image from the imaging unit 150A1 of the camera 150A), the transmission source MAC address is AAAA (a MAC address of the camera 150A), and the data length is 1500 (bytes).

In an image of a front camera 2 (an image from the imaging unit 150A2 of the camera 150A), the transmission source MAC address is AAAA (a MAC address of the camera 150A), and the data length is 1498 (bytes).

In an image of a rear camera 1 (an image from the camera 150B), the transmission source MAC address is BBBB (a MAC address of the camera 150B), and the data length is 1500 (bytes). An image of a side camera 1 (an image from the camera 150C on the left side of the vehicle), the transmission source MAC address is CCCC (a MAC address of the camera 150C on the left side of the vehicle), and the data length is 1500 (bytes). In an image of a side camera 2 (an image from the camera 150C on the right side of the vehicle), the transmission source MAC address is DDDD (a MAC address of the camera 150C on the right side of the vehicle), and the data length is 1500 (bytes).

Here, the data length of the data for high-speed processing is set to 1500 (bytes) or 1498 (bytes). Setting the data length of the image of the front camera 2 to 1498 (bytes) is intended to distinguish the data length of the image of the front camera 2 from the data length (1500 (bytes)) of the image of the front camera 1 having the same transmission source MAC address.

Further, the image data has a large amount of data. Accordingly, when the amount of data is equal to or larger than 1500 (bytes) or 1498 (bytes), the data is divided from a head of the data. A data length as short as one (byte) is used to indicate the last data using the data length. That is, in data having a data length of 1500 (bytes), a data length of 1499 (bytes) is used for the last data, and in data having a data length of 1498 (bytes), a data length of 1497 (bytes) is used for the last data. The data division will be described below with reference to FIG. 5.

The data length of the data for the normal-speed processing may be set to a data length different from the data length used for the data for the high-speed processing. Here, the data length of the data for the normal-speed processing may be set to a data length other than 1497 (bytes), 1498 (bytes), 1499 (bytes), and 1500 (bytes). Since the data for normal-speed processing is lower in communication speed than the data for high-speed processing, it is desirable for the data length of the data for normal-speed processing to be shorter than the data length of the data for high-speed processing.

Figure 5:
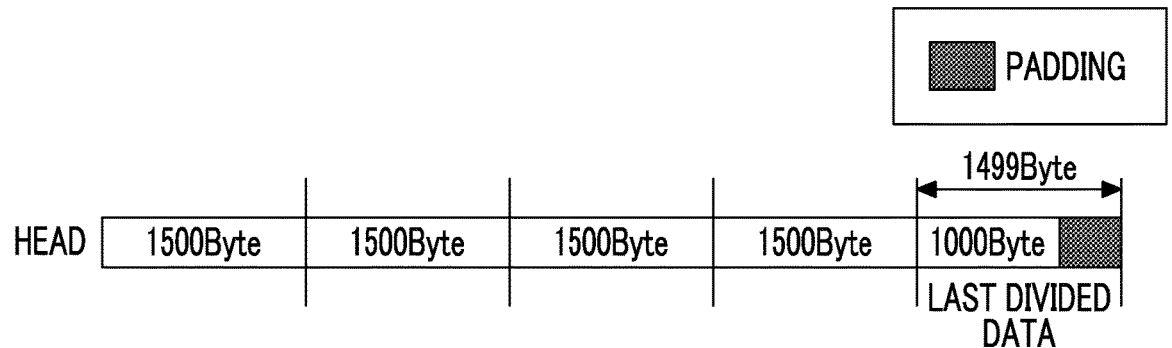
FIG. 5 is a diagram illustrating a scheme by which a high-speed transmission processing unit divides transmission data.

FIG. 5 is a diagram illustrating a scheme by which the high-speed transmission processing unit 135C divides transmission data. A case where the transmission data is image data of the front camera 1 and the data length is 7000 (bytes) will be described by way of example herein. The image data of the front camera 1 is divided by units of 1500 (bytes). The data having a relatively long data length as described above is an example of data having a high priority.

Since the data length of the transmission data is longer than 1500 (bytes) that is the division unit, the high-speed transmission processing unit 135C divides the transmission data into a plurality of pieces of data. By dividing transmission data of 7000 (bytes) from a head thereof, four pieces of divided data of 1500 (bytes) and one piece of last divided data of 1000 (bytes) are obtained.

In order for the last divided data to be recognized as the last divided data of the data for high-speed processing according to the data length, padding is performed on an end of the last divided data of 1000 (bytes) to add unnecessary data (for example, 00h in hexadecimal notation) by 499 (bytes) and obtain a data length of 1499 (bytes), as illustrated in FIG. 5. Thus, the data length of the last divided data that is a fraction with respect to the division unit (here, 1500 (bytes)) is set to a data length one (byte) shorter than the data length of the other divided data.

Figure 6A:
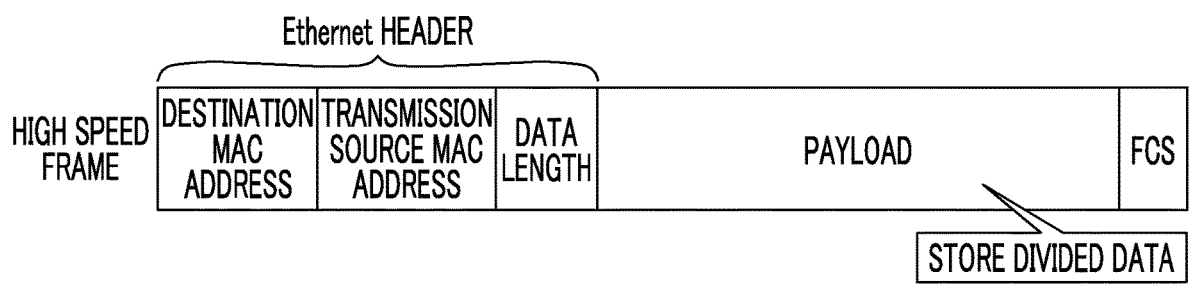
FIG. 6A is a diagram illustrating a frame structure of a high speed frame in which divided data is stored.
Figure 6B:
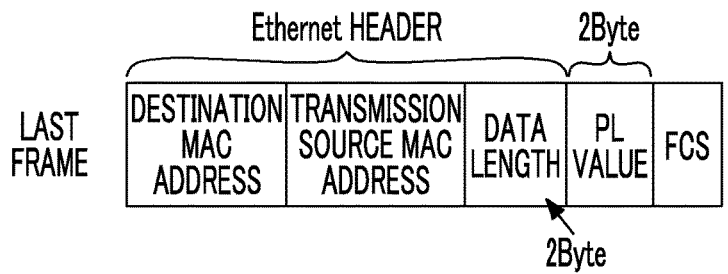
FIG. 6B is a diagram illustrating a frame structure of a last frame.
Figure 6C:
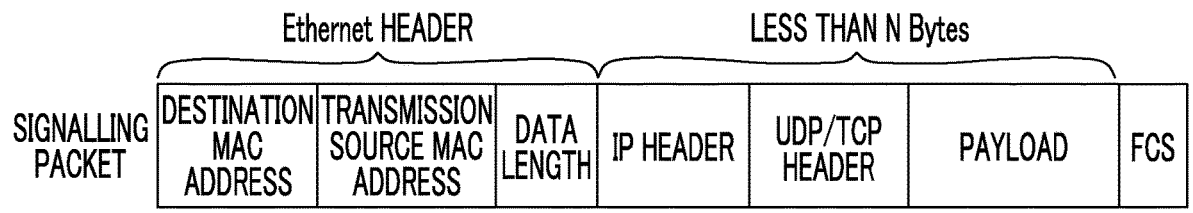
FIG. 6C is a diagram illustrating a frame structure of a frame of data for normal-speed processing.

FIGS. 6A to 6C are diagrams illustrating frame structures of a high speed frame in which divided data is stored, a last frame, and a frame of the data for normal-speed processing.

The frame structure of the high speed frame illustrated in FIG. 6A is a high speed frame of Ethernet (real-time packet), and includes a destination MAC address, a transmission source MAC address, a data length, a payload, and a frame check sequence (FCS). The destination MAC address is a MAC address of a destination of data. The destination MAC address, the transmission source MAC address, and the data length constitute an Ethernet header.

The divided data is stored in the payload. As illustrated in FIG. 5, since five pieces of divided data (four pieces of divided data of 1500 (bytes) and the last divided data of 1499 (bytes) subjected to the padding) obtained by dividing the transmission data of 7000 (bytes) are stored one by one in the payload, five frames for high speed are obtained. The data length is described as 1500 (bytes) in the four frames for high speed from the head, and 1499 (bytes) is described in the last high speed frame.

The last frame illustrated in FIG. 6B includes a destination MAC address, a transmission source MAC address, a data length, a padding length (PL) value, and an FCS. The last frame is a frame transmitted following the last high speed frame, and a padded data length (PL value) included in the last high speed frame is stored. The PL value is represented by, for example, two (bytes). In this case, the data length of the last frame is two (bytes). When the PL value is 499 (bytes) as described above, the PL value may be represented as 1F3h in hexadecimal notation, for example.

The frame of the data for normal-speed processing illustrated in FIG. 6C is a signaling packet including a destination MAC address, a transmission source MAC address, a data length, an IP header, a UDP/TCP header, a payload, and an FCS. Here, since the data lengths used in the high speed frame are 1497 (bytes), 1498 (bytes), 1499 (bytes), and 1500 (bytes), when the above minimum value is N (bytes) (N=1497), the data length of the IP header, the UDP/TCP header, and the payload may be smaller than N (bytes). The data length of the frame of the data for normal-speed processing illustrated in FIG. 6C is smaller than N (bytes).

Next, the transmission process and the reception process performed by the high-speed frame processing unit 135 will be described with reference to FIGS. 7 to 9. Here, it is assumed that the ECU 130 on the transmission side and the ECU 130 on the reception side perform communication in advance and hold common (same) list data.

FIG. 7 is a flowchart illustrating the transmission process performed by the high-speed frame processing unit 135. The transmission process performed by the high-speed frame processing unit 135 of the image recognition ECU 130B will be described by way of example herein.

The main controller 135A starts a process. The main controller 135A starts the process, for example, when an ignition switch of the vehicle is turned on.

The main controller 135A receives a transmission request for data X from the application processing unit 136 (step S1). The data X is transmission data that the application processing unit 136 obtains from the autonomous driving ECU 130A via the bus 120A, the CGW-ECU 110, the bus 120, the media access controller 131, the IP processing unit 133, and the TCP/UDP port 134, and a data name thereof is X.

The transmission data determination unit 135B refers to the list data (see FIG. 4) to search for the data name of the data X (step S2).

The transmission data determination unit 135B determines whether there is a data name of the data X as the data for high-speed processing (step S3).

When the transmission data determination unit 135B determines that there is a data name of the data X (S3: YES), the high-speed transmission processing unit 135C generates a high speed frame and a last frame (step S4). The process of step S4 will be described in detail with reference to FIG. 8.

The main controller 135A writes the high speed frame and the last frame generated in step S4 to the DMA 132 (step S5). As a result, the high speed frame and the last frame are output to the bus 120B by the DMA 132 and transferred to the autonomous driving ECU 130A via the CGW-ECU 110 and the bus 120A.

The main controller 135A determines whether the process is to be ended (step S6). For example, when the ignition switch of the vehicle is turned off, the main controller 135A determines that the process is to be ended.

When the main controller 135A determines that the process is to be ended (S6: YES), the main controller 135A ends a series of processes. For example, when the ignition switch of the vehicle is turned off, the main controller 135A ends the process. Further, when the main controller 135A determines that the process is not to be ended (S6: NO), the main controller 135A causes the flow to return to step S1.

When the transmission data determination unit 135B determines in step S3 that there is no data name of the data X (S3: NO), the main controller 135A causes the flow to return to step S1. This is intended to perform the next process for the transmission data.

FIG. 8 is a diagram illustrating a flowchart of the transmission process that is performed by the high-speed transmission processing unit 135C. The flowchart illustrated in FIG. 8 indicates a detailed process of step S4.

When the high-speed transmission processing unit 135C starts the process of step S4, the high-speed transmission processing unit 135C determines whether a data length DLX of the data X is shorter than a data length DL1 (DLX<DL1) associated with the data X in the list data (step S41).

When the high-speed transmission processing unit 135C determines that the data length DLX is not shorter than the data length DL1 (S41: NO), the high-speed transmission processing unit 135C divides data corresponding to the data length DL1 from the head of the data X to generate a high speed frame (step S42). When the process of step S42 is ended, the high-speed transmission processing unit 135C causes the flow to return to step S41. When the process of step S42 is repeated, a plurality of frames for high speed is generated. For example, when the data length of the data X is 7000 (bytes) and the data length DL1 is 1500 (bytes), four frames for high speed are generated.

When the high-speed transmission processing unit 135C determines in step S41 that the data length DLX is shorter than the data length DL1 (S41: YES), the high-speed transmission processing unit 135C performs padding on the remaining data of the data X to generate a high speed frame having a data length DL2 one (byte) shorter than the data length DL1 (bytes) (step S43).

For example, when the data length DL1 is 1500 (bytes) and the data length of the remaining data of the data X is 1000 (bytes), the high-speed transmission processing unit 135C performs padding of 499 (bytes) to generate the last high speed frame of 1499 (bytes) as a high speed frame having the data length DL2.

The high-speed transmission processing unit 135C generates a last frame (two (bytes)) having the data length subjected to the padding in step S43 as the PL value (step S44).

The high-speed transmission processing unit 135C then ends the process of step S4. Although the transmission process performed by the high-speed frame processing unit 135 of the image recognition ECU 130B has been described herein, the same applies to a transmission process that is performed by the high-speed frame processing unit 135 of the autonomous driving ECU 130A or other ECUs.

In step S43, when the data length of the remaining data of the data X is zero (bytes), padding may not be performed. In this case, the PL value of the last frame generated in step S44 may be set to zero (bytes), and the last high speed frame is data last divided in step S42.

Further, in step S43, when the data length of the remaining data of the data X is zero (bytes), padding of 1499 (bytes) may be performed to generate the last high speed frame in step S43. In this case, the PL value of the last frame generated in step S44 may be set to 1499 (bytes).

Figure 9:
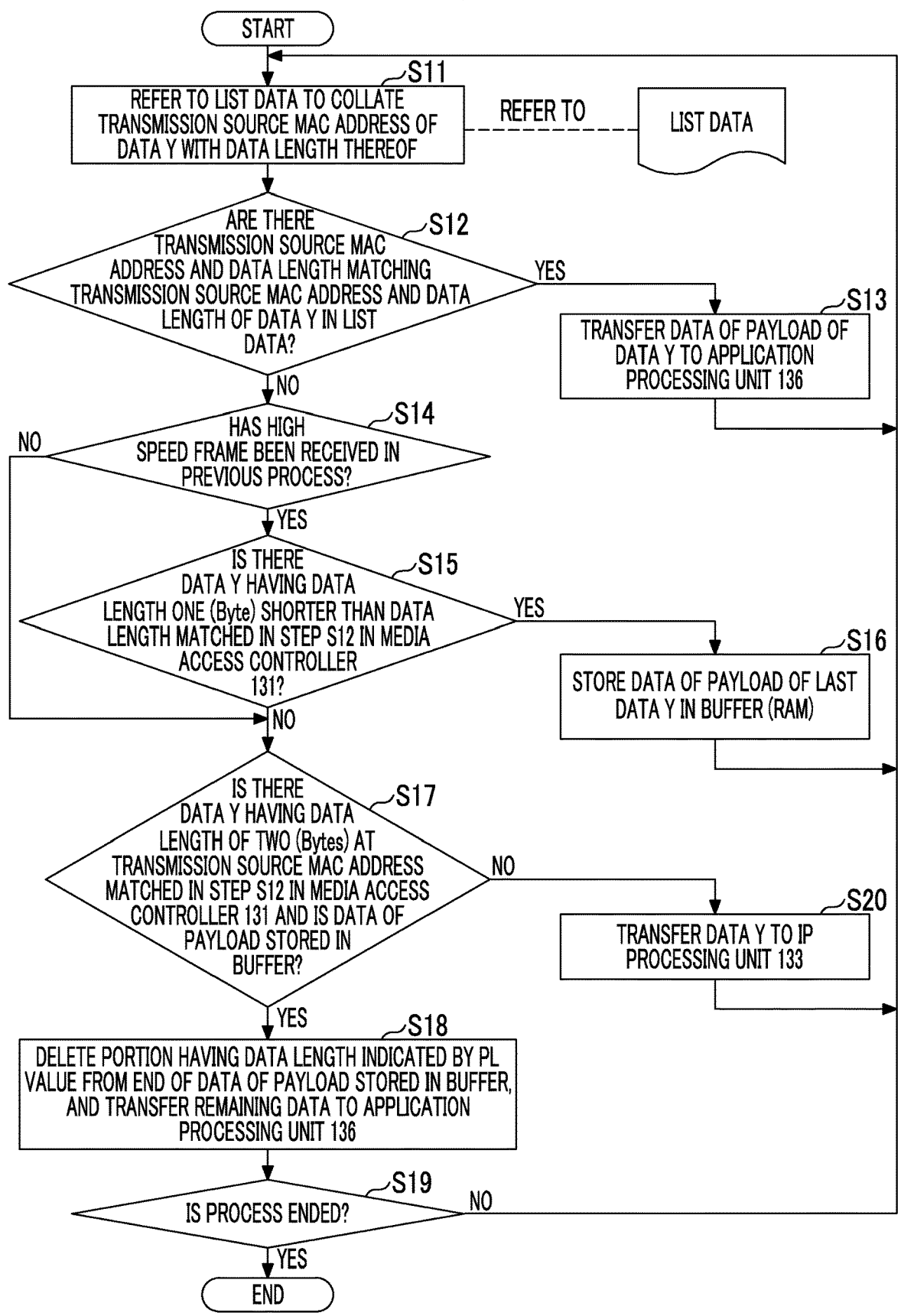
FIG. 9 is a diagram illustrating a flowchart of a reception process performed by the high-speed frame processing unit.

FIG. 9 is a diagram illustrating a flowchart of a reception process that is performed by the high-speed frame processing unit 135. A transmission process that is performed by the high-speed frame processing unit 135 of the autonomous driving ECU 130A will be described herein by way of example.

The main controller 135A starts the process. The main controller 135A starts the process, for example, when the ignition switch of the vehicle is turned on.

The reception data determination unit 135D refers to the list data to collate the transmission source MAC address of data Y in the media access controller 131 with the data length thereof (step S11). The data Y, for example, is transferred from the image recognition ECU 130B to the media access controller 131 of the autonomous driving ECU 130A via the bus 120B, the CGW-ECU 110, and the bus 120A.

The reception data determination unit 135D determines whether there are a transmission source MAC address and a data length matching the transmission source MAC address and the data length of the data Y in the list data (step S12).

When the reception data determination unit 135D determines that there are the matched transmission source MAC address and the matched data length in the list data (S12: YES), the reception data determination unit 135D acquires the data Y from the media access controller 131 and transfers data of a payload portion of the data Y (a high speed frame other than the last frame) to the application processing unit 136 (step S13).

In this case, this is intended to transfer the data Y to the application processing unit 136 and restore the data X since the data Y is a high speed frame. When the reception data determination unit 135D ends the process of step S13, the main controller 135A causes the flow to return to step S11.

For example, when the data length stored in the list data is 1500 (bytes), the data length of the data Y is 1500 (bytes), and the transmission source MAC address stored in the list data matches the transmission source MAC address of the data Y, the reception data determination unit 135D transfers the data of the payload portion of the data Y to the application processing unit 136.

When the reception data determination unit 135D determines that the matched transmission source MAC address and the matched data length are not stored in the list data (S12: NO), the reception data determination unit 135D determines whether a high speed frame has been received in a previous process (step S14). The reception data determination unit 135D determines whether the high speed frame has been received in the previous process before the reception data determination unit 135D determines whether there is the last high speed frame in the media access controller 131 in step S15.

When the reception data determination unit 135D determines that the high speed frame has been received in the previous process (S14: YES), the reception data determination unit 135D determines whether there is data Y having a data length one (byte) shorter than the data length determined to match in step S12 at the transmission source MAC address determined to match in step S12 in the media access controller 131 (step S15).

When the reception data determination unit 135D determines in step S15 that there is the data Y (S15: YES), the reception data determination unit 135D stores the data of the payload portion of the data Y (the last high speed frame) in a buffer (RAM) (step S16). When the reception data determination unit 135D ends the process of step S16, the main controller 135A causes the flow to return to step S11.

For example, when the data length stored in the list data is 1500 (bytes), the data length of the data Y is 1499 (bytes), and the transmission source MAC address stored in the list data and the transmission source MAC address of the data Y are matched, the reception data determination unit 135D stores the data of the payload portion of the data Y of 1499 (bytes) in the buffer (RAM). The storage in the buffer (RAM) instead of the transfer to the application processing unit 136 is intended to delete the padded portion in post-processing.

When the reception data determination unit 135D determines in step S15 that there is no data Y (S15: NO), the reception data determination unit 135D determines whether there is the data Y having a data length of two (bytes) at the transmission source MAC address determined to match in step S12 in the media access controller 131 and the data of the payload portion is stored in the buffer (step S17).

When the reception data determination unit 135D determines that there is the data Y as described above in the media access controller 131 and the data of the payload portion is stored in the buffer (S17: YES), the reception data determination unit 135D reads the PL value of the data Y having the data length of two (bytes) present in the media access controller 131, deletes a portion (the padded portion) having the data length indicated by the PL value from the end of the data of the payload portion stored in the buffer, and transfers the remaining data to the application processing unit 136 (step S18). As a result, the application processing unit 136 combines the data acquired in step S13 with the data acquired in step S18 to obtain data X.

For example, when the PL value of the data Y having the data length of two (bytes) present in the media access controller 131 is 499 (bytes), the reception data determination unit 135D deletes a portion having 499 (bytes) from the end of the data (1499 (bytes)) of the payload portion stored in the buffer, and transfers the remaining data having 1000 (bytes) to the application processing unit 136. By sequentially arranging four pieces of data of 1500 (bytes) and one piece of data of 1000 (bytes) from the head, data X of 7000 (bytes) is obtained.

When the main controller 135A ends the process of step S18, the main controller 135A determines whether the processes are ended (step S19). When the main controller 135A determines that the process is not to be ended (S19: NO), the main controller 135A causes the flow to return to step S11. Further, when the main controller 135A determines that the process is to be ended (S19: YES), the main controller 135A ends the series of processes. For example, when the ignition switch of the vehicle is turned off, the main controller 135A ends the process.

When the reception data determination unit 135D determines that there is the data Y as described above in the media access controller 131 and the data of the payload portion is not stored in the buffer (S17: NO), the reception data determination unit 135D transfers the data Y to the IP processing unit 133 (step S20).

In this case, since the data Y is not data for high-speed processing and is data for normal processing, the data Y is received by the application processing unit 136 via the IP processing unit 133 and the TCP/UDP port 134. When the reception data determination unit 135D ends the process of step S20, the main controller 135A causes the flow to return to step S11.

Further, when the reception data determination unit 135D determines in step S14 that the high speed frame has not been received in the previous process (S14: NO), the main controller 135A causes the flow to proceed to step S17.

As described above, it is possible to determine whether high-speed processing is performed by determining whether the data length of the reception data is a predetermined data length for high-speed processing. It is not needed for a unique data format or unique data to be used for the determination.

Therefore, it is possible to provide the in-vehicle network system 100 capable of processing data having a high priority at high speed without adding a unique data format or unique data.

Further, since the data length one (byte) smaller than the data other than the last data obtained by dividing the transmission data is used by padding the last data obtained by dividing the transmission data, the reception data determination unit 135D that has received the data can discriminate that the data is the last data of the reception data based on the data length.

Therefore, it is possible to provide the in-vehicle network system 100 capable of easily discriminating the last data of the reception data and processing data having a high priority at high speed.

Further, since the ECU 130 on the transmission side and the ECU 130 on the reception side hold the common (same) list data, and the data length of the divided data and the transmission source MAC address (identifier) are associated in the list data, it is possible to provide the in-vehicle network system capable of processing data having a high priority at high speed by discriminating whether or not the data is a target of high-speed processing based on the transmission source MAC address (identifier) and the data length. Further, by using the transmission source MAC address (identifier) and the data length, it is possible to identify the data from each other even when data lengths of data having different transmission source MAC addresses are the same.

Although the aspect in which the transmission data is divided into divided data having a predetermined data length (for example, 1500 (bytes)) and padding is performed on the predetermined data length has been described above, padding may be performed to set the transmission data to the predetermined data length (for example, 1500 (bytes)) when the data length of the transmission data is shorter than the predetermined data length (for example, 1500 (bytes)).

The ECU 130 that has received the reception data having the predetermined data length (for example, 1500 (bytes)) may determine that the reception data is data for high-speed processing based on the predetermined data length (for example, 1500 (bytes)) and the transmission source MAC address. That is, when the data length of the transmission data is shorter than the predetermined data length (for example, 1500 (bytes)), the division process is not performed. In this case, the last frame in which the PL value indicating the data length of the padded portion has been described next to one piece of transmission data may be transmitted.

Further, the aspect in which the data length indicating the last reception data is one (byte) shorter than the data length of the reception data other than the last reception data has been described above, but a difference in data length is not limited to one (byte).

Further, although the aspect in which a determination as to whether or not the reception data is the data for high-speed processing is performed according to whether or not the transmission source MAC address and the data length match the transmission source MAC address and the data length stored in the list data has been described above, the transmission source MAC address may not be used for the determination when the determination can be performed using solely the data length without using the transmission source MAC address. For example, when the number of types of data to be set to the data length of 1500 (bytes) is one, it is possible to determine whether the reception data is the data for high-speed processing using solely the data length even without using the transmission source MAC address.

Figure 10:
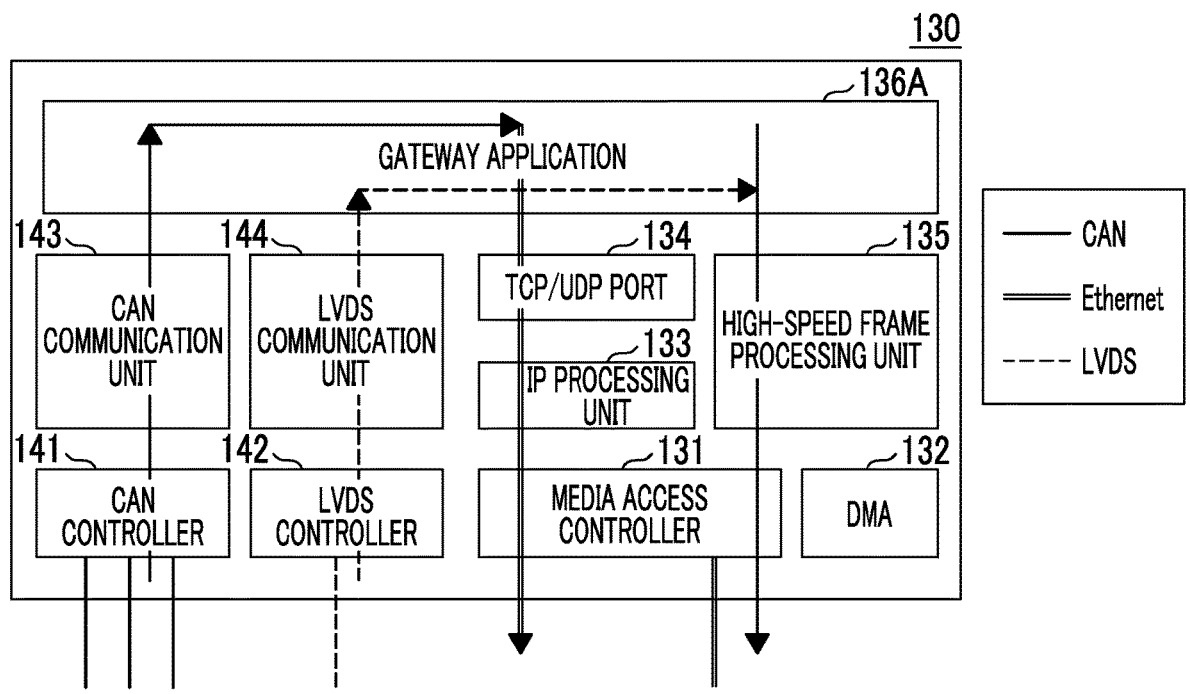
FIG. 10 is a diagram illustrating a CGW-ECU according to a modification example of the embodiment.

FIG. 10 is a diagram illustrating a CGW-ECU 110A according to a modification example of the embodiment. The CGW-ECU 110A is a multi-protocol gateway device that relays data according to a plurality of protocols.

The CGW-ECU 110A includes a media access controller 131, a DMA 132, an IP processing unit 133, a TCP/UDP port 134, a high-speed frame processing unit 135, an application processing unit 136A, a controller area network (CAN) controller 141, a low voltage differential signaling (LVDS) controller 142, a CAN communication unit 143, and an LVDS communication unit 144.

The media access controller 131, the DMA 132, the IP processing unit 133, the TCP/UDP port 134, and the high-speed frame processing unit 135 are the same as those illustrated in FIG. 2. The application processing unit 136A is obtained by adding a function of performing data conversion between a CAN protocol, an LVDS protocol, and an Ethernet protocol to the application processing unit 136 illustrated in FIG. 2.

In FIG. 10, a route of data (message) of the CAN protocol is indicated by a solid line, a route of data of the LVDS protocol is indicated by a broken line, and a route of data of the Ethernet protocol is indicated by a double line. Although a bus connected to the CGW-ECU 110A is omitted in FIG. 10, routes indicated by the solid line, the broken line, and the double line outside the CGW-ECU 110A are routes passing through the bus connected to the CGW-ECU 110A.

The CAN controller 141 is an interface that receives the data (message) of the CAN protocol from the bus. The LVDS controller 142 is an interface that receives the data of the LVDS protocol from the bus. The CAN controller 141 and the LVDS controller 142 are configured as hardware, similar to the media access controller 131 and the DMA 132.

The CAN communication unit 143 and the LVDS communication unit 144 are functional blocks obtained by the CPU executing a program, similar to the IP processing unit 133, the TCP/UDP port 134, the high-speed frame processing unit 135, and the application processing unit 136. The CAN communication unit 143 and the LVDS communication unit 144 belong to layer 3 (network layer) in the OSI reference model and perform processes of transferring CAN data and LVDS data, respectively.

Further, for example, the cameras 150A, 150B, 150C are assumed herein to output image data in an LVDS format. The image data in the LVDS format is acquired by the LVDS controller 142, input to the application processing unit 136A via the LVDS communication unit 144, converted from the data of the LVDS protocol to data of the Ethernet protocol, and acquired by the high-speed frame processing unit 135. The data is output from the high-speed frame processing unit 135 to the bus via the DMA 132.

In this case, when list data that stores a data name of the data of the LVDS protocol that is the target of high-speed processing is used, the data of the LVDS protocol that is the target of high-speed processing is converted to the data of the Ethernet protocol by the application processing unit 136A, and then, the data may be further divided into predetermined data lengths (for example, 1500 (bytes)) to generate a high speed frame and a last frame and the high speed frame and the last frame may be output to the bus via the DMA 132.

The data of the LVDS protocol that is the target of high-speed processing is converted to the data of the Ethernet protocol by the application processing unit 136A, and then, the data may be output to the bus via the IP processing unit 133 and the TCP/UDP port 134.

Since the data of the CAN protocol has a shorter data length, the data of the CAN protocol may not be the target of high-speed processing. The data (message) acquired by the CAN controller 141 may be converted to the data of the Ethernet protocol by the application processing unit 136A via the CAN communication unit 143 and may be output to the bus via the IP processing unit 133 and the TCP/UDP port 134.

As described above, in a multi-protocol type of CGW-ECU 110A, it is possible to determine whether high-speed processing is performed by determining whether the data length of the reception data is a predetermined data length for high-speed processing, and to process data having a high priority at high speed without adding a unique data format or unique data.

The in-vehicle network system of the exemplary embodiment of the present disclosure has been described above, but the present disclosure is not limited to the specifically disclosed embodiment, and various modifications or changes can be made without departing from the claims.

What is claimed is:
1. An in-vehicle network system comprising:
a transmitter electronic control unit (ECU); and
a receiver ECU configured to communicate with the transmitter ECU via a network, wherein:
the transmitter ECU is programmed to
include list data indicating an identifier of transmission data that is a target of high-speed processing and a first data length,
determine whether transmission data is the target of high-speed processing using the identifier indicated in the list data,
perform a process of transmitting data having the first data length obtained by dividing the transmission data determined to be the target of high-speed processing into the first data length or obtained by adding predetermined data to the transmission data determined to be the target of high-speed processing to obtain the first data length, to the network, and
perform the process of transmitting data having the first data length based on the first data length indicated in the list data; and
the receiver ECU is programmed to
include the list data,
determine whether a data length of reception data received via the network is the first data length based on the first data length indicated in the list data,
perform a process of receiving the reception data at a first processing speed when determining that the reception data does not have the first data length, and
perform a process of receiving the reception data at a second processing speed when determining that the reception data has the first data length, wherein the second processing speed is faster than the first processing speed.

2. The in-vehicle network system according to claim 1, wherein:
when data shorter than the first data length is generated at an end of a frame when the transmitter ECU divides the transmission data by the first data length from a head of the frame, the transmitter ECU is further programmed to add predetermined data to the data to generate data having a second data length a predetermined data length shorter than the first data length, and transmit data having the second data length at the second processing speed; and
the receiver ECU is further programmed to determine whether the data length of the reception data is the second data length, and determine that the reception data is data of last reception data among a plurality of pieces of reception data divided from the transmission data when the receiver ECU determines that reception data subsequent to the reception data determined to have the first data length has the second data length.

3. The in-vehicle network system according to claim 1, wherein a frame structure of the transmission data determined to be the target of high-speed processing is a high speed Ethernet frame, and the frame includes a destination media access control (MAC) address, a transmission source MAC address, a data length, a payload, and a frame check sequence, the destination MAC address is a MAC address of a destination of data, and the divided transmission data is stored in the payload.

4. The in-vehicle network system according to claim 3, wherein the transmitter ECU is programmed to perform a process of transmitting transmission data determined not to be the target of high-speed processing to the network as a frame of data for normal-speed processing, the frame of data for normal-speed processing being a signaling packet including the destination MAC address, the transmission source MAC address, the data length, an IP header, a UDP/TCP header, the payload, and the frame check sequence, and control a data length of the data frame to be smaller than a minimum value of the data length of the transmission data that is the target of high-speed processing.

5. The in-vehicle network system according to claim 1, wherein the transmitter ECU is further programmed to perform a process of transmitting transmission data that is the target of high-speed processing to the network via direct memory access.

6. The in-vehicle network system according to claim 1, wherein the transmitter ECU is programmed to
perform a process of transmitting data not having the first data length to the network at the first processing speed; and perform the process of transmitting data having the first data length to the network at the second processing speed.

\* \* \* \* \*